United States Patent
Kurthakoti Chandrashekhara et al.

(10) Patent No.: US 9,640,997 B2
(45) Date of Patent: May 2, 2017

(54) POWER SYSTEM STABILIZATION USING DISTRIBUTED INVERTERS

(75) Inventors: Divya Kurthakoti Chandrashekhara, New York, NY (US); Yaosuo Xue, Plainsboro, NJ (US)

(73) Assignee: Siemens Corporation, Iselin, NJ (US)

( * ) Notice: Subject to any disclaimer, the term of this patent is extended or adjusted under 35 U.S.C. 154(b) by 713 days.

(21) Appl. No.: 13/561,356

(22) Filed: Jul. 30, 2012

(65) Prior Publication Data
US 2014/0032000 A1    Jan. 30, 2014

(51) Int. Cl.
H02J 3/46    (2006.01)
H02J 3/38    (2006.01)
H02J 3/40    (2006.01)

(52) U.S. Cl.
CPC ............. H02J 3/46 (2013.01); H02J 3/382 (2013.01); H02J 3/40 (2013.01); Y02E 10/563 (2013.01); Y02E 10/763 (2013.01)

(58) Field of Classification Search
CPC ...................................... G05B 15/00
USPC ........................................ 700/292
See application file for complete search history.

(56) References Cited

U.S. PATENT DOCUMENTS

| | | | | |
|---|---|---|---|---|
| 7,948,217 B2* | 5/2011 | Oohara et al. | | 322/24 |
| 2003/0011348 A1* | 1/2003 | Lof | | F03D 9/003 |
| | | | | 322/37 |
| 2010/0117606 A1* | 5/2010 | Oohara | | H02J 3/24 |
| | | | | 322/28 |
| 2011/0109085 A1 | 5/2011 | Nelson | | |
| 2012/0004781 A1* | 1/2012 | Santos | | F03D 7/0284 |
| | | | | 700/287 |
| 2012/0205981 A1* | 8/2012 | Varma | | H02J 3/01 |
| | | | | 307/64 |

OTHER PUBLICATIONS

D. J. Vowles, et al., "Effect of Wind Generation on Small-Signal Stability—A New Zealand Example," in Proc. 2008 IEEE Power & Energy Society General Meeting, pp. 5217-5224, 2008.
H. Liu, et al., "Impact of High Penetration of Solar Photovoltaic Generation on Power System Small Stability," in Proc. 2010 International Conference on Power System Technology, pp. 1-7, 2010.
G. Slootweg, et al., "The impact of large scale wind power generation on power system oscillations," Electric Power Systems Research, vol. 67, No. 1, pp. 9-20, Oct. 2003.

* cited by examiner

*Primary Examiner* — Robert Fennema
*Assistant Examiner* — Jay Jung

(57) ABSTRACT

A power grid of renewable sources is stabilized. Inverters for connecting power sources, such as wind turbines, batteries, or photovoltaics, to a grid are used to damp grid oscillations. The damping is distributed to the inverters, but based on measurements for the grid rather than local measurements. The control of the damping is based on grid wide analysis, and the damping is performed proportionately by already existing inverters distributed throughout the grid.

15 Claims, 3 Drawing Sheets

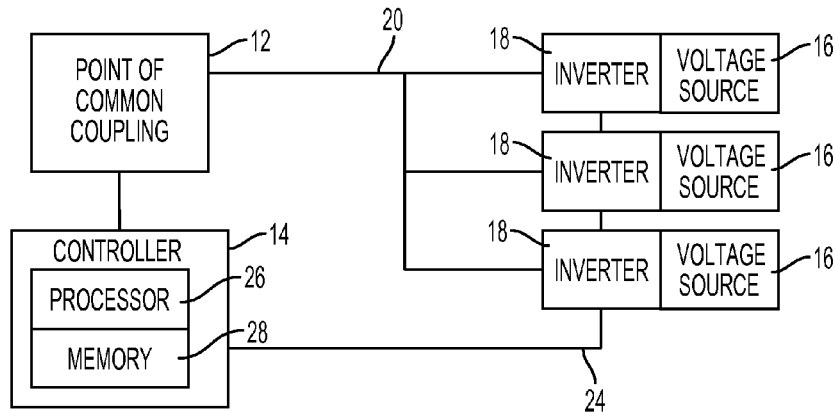
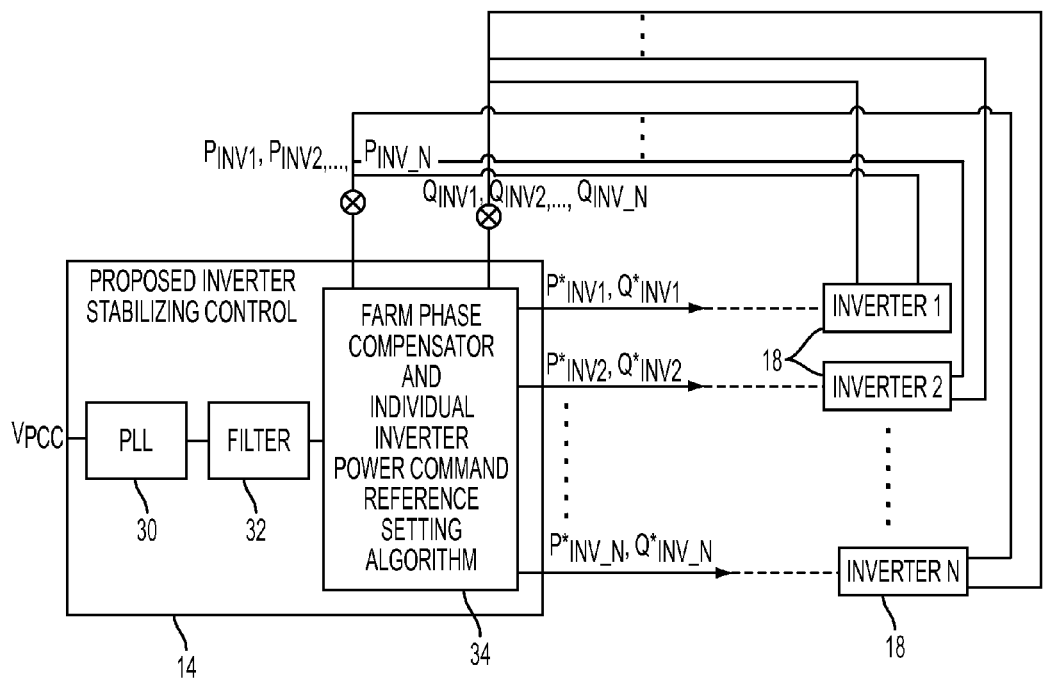
FIG. 1
FIG. 2

POWER SYSTEM STABILIZATION USING DISTRIBUTED INVERTERS

BACKGROUND

The present embodiments relate to stabilizing a power system. In particular, low frequency oscillations present in a power grid are damped to stabilize a power grid.

Wind and solar farms are connected to transmission or distribution grids. Multiple voltage sources within a wind farm, solar farm, or a microgrid, such as wind turbines, photovoltaics, or batteries connect through inverters to the grid at a point called a point of common connection. Low frequency oscillations may occur within the power grid of synchronous generators and distributed power sources. The low frequency oscillations due to reduced system damping may affect the stability of the grid and in extreme situations result in blackouts.

Traditionally local oscillations are damped by power system stabilizers (PSS) present within a power plant. The PSS associated with a synchronous generator normally uses local measurements, such as generator speed, terminal or field voltage etc., to provide additional damping torque. The present day inverter interfaced distributed generation sources do not have a PSS functionality and hence cannot provide damping for low frequency oscillations.

BRIEF SUMMARY

By way of introduction, the preferred embodiments described below include methods, systems, instructions, and computer readable media for stabilizing a power system of distributed power sources with inverters. The stabilization control proposed for the inverters interfacing with distributed power sources, such as wind turbines, batteries, or photovoltaics, to a grid are used to damp grid oscillations. The damping is distributed to the inverters, but based on measurements at the PCC rather than local measurements. The low frequency oscillations are detected and the desired compensation is computed. The control of the damping is distributed to individual inverters.

In a first aspect, a system is provided for stabilizing a power system. A plurality of inverters connects respective sources of power to a power grid. A controller is configured to measure a low frequency oscillation of the power grid and to distribute signals to the inverters. The signals control the different inverters to damp different amounts of the low frequency oscillation at a given time.

In a second aspect, a non-transitory computer readable storage medium has stored therein data representing instructions executable by a programmed processor for stabilizing a power system. The storage medium includes instructions for computing and distributing the damping power signals (active and reactive), from a central location in the renewable energy power grid, to the inverters distributed in the power grid. The damping power generated by the inverters damps the low frequency oscillations in the power grid.

In a third aspect, a method is provided for stabilizing a power system. Oscillations in a power grid interconnecting voltage sources are measured. Damping of the oscillation is distributed among existing voltage source converters of the power grid.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 1 is a diagram of one embodiment of a system for stabilizing a power system;

FIG. 2 is a diagram of another embodiment of a system for stabilizing a power system;

DETAILED DESCRIPTION OF THE DRAWINGS AND PRESENTLY PREFERRED EMBODIMENTS

Figure 3:
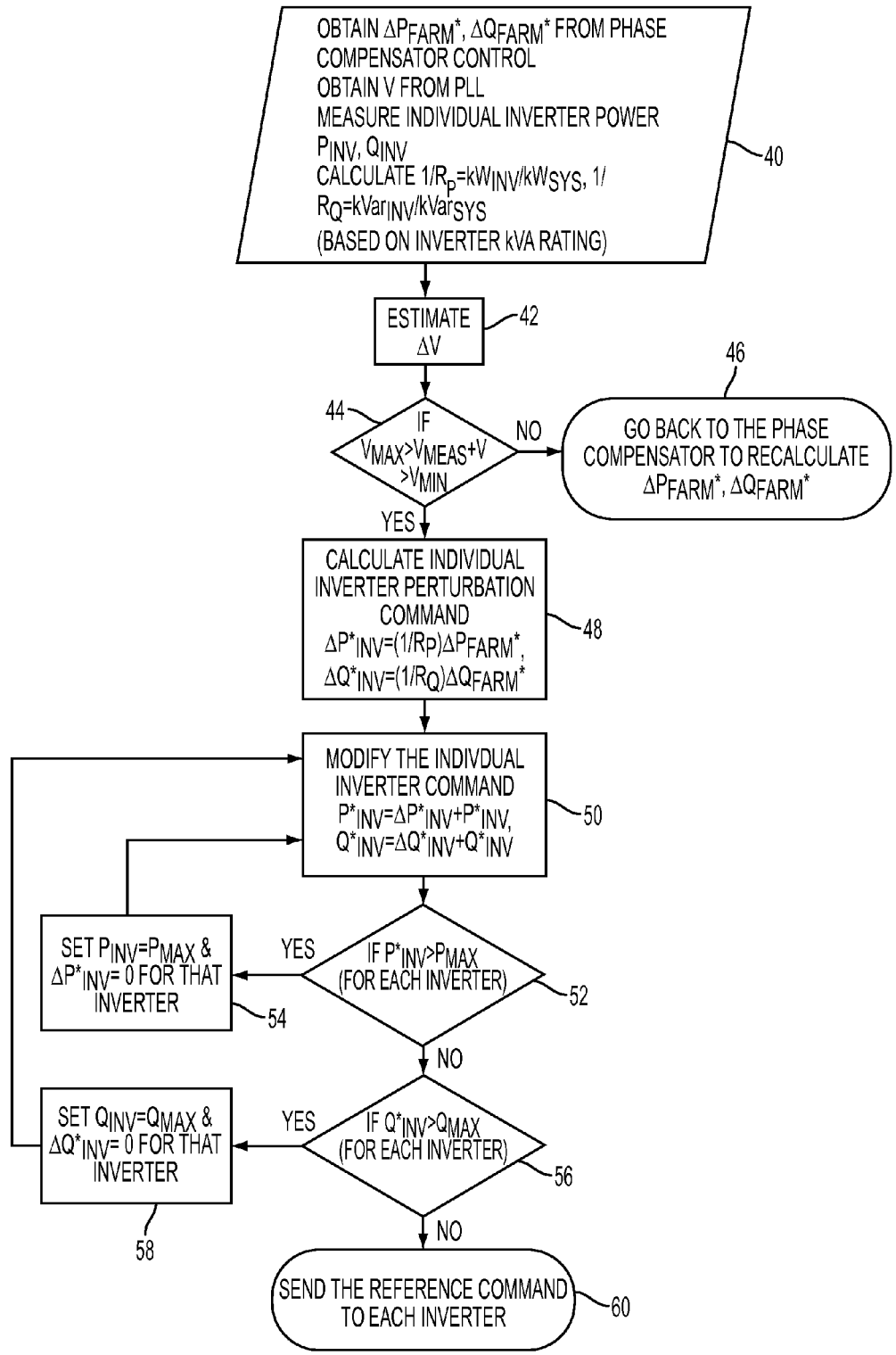
FIG. 3 is a flow chart diagram of one embodiment of a method implemented by a controller to stabilize a power system with distributed damping.

Grid stability can be improved by damping low frequency oscillations. Renewable sources connected to the grid through voltage source converters may, in some situations, reduce power system damping, destabilizing the grid. Low frequency oscillations may be inter area and/or local area oscillations of the grid. The low frequency oscillations are damped in a transmission or distribution grid containing multiple distributed inverters. Distributed inverters in a microgrid, wind farm, or solar farm are coordinated to damp the low frequency oscillations normally exhibiting in the grid.

The control algorithm and structure detect the low frequency oscillations. Damping for the detected low frequency oscillations is divided among inverters. Power commands, such as both active and reactive perturbation signal commands, are generated using a phase compensation method. The perturbation signal reference commands are distributed to each individual inverter within a farm or within a micro grid. The reference signal distribution generates a perturbation command reference for each inverter while taking into account other factors, such as inverter rating, line and system characteristics (e.g. R/X ratio, and sensitivity to change in active/reactive power).

The distribution of damping is generic and is applicable to any source using voltage source converter (VSC) interfaces to the grid. The differences in inverter controls may be accounted for irrespective of different vendors or manufacturers of the inverters. The distribution may be implemented with centralized or distributed inverter control systems.

FIG. 1 shows a system for stabilizing a power system. The system includes a controller 14 with a memory 28 and a processor 26, a point of common coupling 12, voltage sources or power sources 16, inverters 18, a power grid 20, and a communications network 24. Additional, different, or fewer components may be provided. For example, more or fewer of any component is provided. As another example, the point of common coupling 12 is not provided.

The point of common coupling 12 is a location at which the local electric power system (EPS) or local power grid 20 connects with the mains power systems or mains power grid. For example, the point of common coupling is a transformer or transformer station connecting more localized wind farm, solar farm, or micro grid to a wide area power grid.

The local power grid 20 includes interconnected power lines. Power cables or other power transmitting structure are provided. Any grid or network topology may be provided. Transformers, converters, distribution stations, or other power grid components may be included. The local power grid 20 connects the various voltage sources 16 to the point of common coupling 12 for adding power to the other grid.

In one embodiment, the local power grid 20 is transmission lines in a wind turbine farm. In other embodiments, the local power grid 20 is for a solar farm, smart grid, micro grid, or grid of other renewable energy sources. Any power grid with distributed, controllable inverters 24 may be used. For example, the local power grid 20 is an alternating current micro grid with a mix of different distributed energy sources interfaced by controllable inverters 18.

The voltage sources 16 are sources of power. Any source 16 may be used, such as wind turbines, photo voltaic arrays, batteries, or combinations thereof. Generators from thermal heating or wave motion turbines may be used. Each of the voltage sources 16 is the same or different type of source. The voltage sources 16 may be uniform or vary, such as all being wind turbines, but with the same or different generating capacity.

The inverters 18 connect the power sources 16 to the local power grid 20. The inverters 18 are voltage source converters with power system stabilization functionality. For a wind turbine power source, the inverter 18 may convert the alternating current from the turbine to a direct current and then back to an alternating current. For a photo voltaic source, the inverter 18 may convert the direct current from the photo voltaic to an alternating current. Harmonic filtering, voltage transforming, and/or power factor control may also be provided by the inverter 18.

One inverter 18 is provided for each power source 16. Different inverters 18 connect with different power sources 16. The inverters 18 are in housings with the power sources 16, connect locally but are in different housings, or may be spaced from the power sources 16, such as by one or more meters. In other embodiments, more than one power source 16 may connect with a same inverter 18, or multiple inverters 18 may connect with a same power source 16.

The inverters 18 are controllable. The inverters 18 include power semiconductor switching devices, passive components (inductors, capacitors), control circuits, processors, and other components for communicating with the controller 14. The inverter 18 operates based on signals from the controller 14. For example, active and reactive power levels are established by the controller 14. The control circuits or control board in an inverter 18 receive the power reference (i.e., active and reactive power levels) and generate the gating pulses for power switching devices using appropriate vector controls and pulse-width modulation.

Circuits or sensors for measuring voltage and current, or other measuring may be provided. The active power and reactive power may be computed using voltage and current measurements. In response to control signals from the controller 14, measured information may be provided to the controller 14. Alternatively, the measured information is provided without request from the controller 14.

The inverters 18 are the same or different. For example, the inverters 18 are manufactured by a same entity as a same type and with the same ratings. As another example, the inverters 18 have different ratings, are of different types, and/or manufactured by different entities.

The communications network 24 is a wired or wireless network. Any type of communications may be used, such as industry Ethernet, Modbus, Profibus, IEEE 802.11, or others. Twisted pair, coaxial cable, other wires, or fiber optics may be used. Cellular or other wireless communication may be used. Combinations of wired and wireless may be used. In one embodiment, the communications network 24 is separate from the local power grid 20. In other embodiment, the transmission lines of the local power grid 20 are modulated with communications, so the communications network 24 is the power grid 20.

The communications network 24 connects the controller 14 with the inverters 18. The controller 14 and inverters 18 include ports or interfaces for connection with the communications network 24. Other connections for other components may be used.

The controller 14 includes a processor 28 and a memory 28. In the embodiment shown in FIG. 2, the controller 14 also includes a phased locked loop 30, a filter 32, and a phase compensator 34. Depending on analog or digital implantation of controller 14, additional, different, or fewer components may be provided. For example, the filter is not provided. As another example, the phase compensator 34 is not provided. While one controller 14 is shown, multiple controllers in a distributed implementation may be used. The controller 14 controls the inverters for stabilization of the local power grid 20. The embodiment of FIG. 2 represents one approach for the damping control structure. Other approaches may be used, such as using the processor 26 of FIG. 1.

The controller 14 is a centralized controller. One farm or local grid level controller 14 sends commands or requests to multiple inverters 18. The one controller 14 may be at any location relative to the inverters 18 and/or the local power grid 20. For example, the centralized controller 14 is not at a geographically center location, but is in a same facility as the point of common coupling. In alternative embodiments, multiple controllers 14 are used in a distributed control rather than centralized control. Multiple controllers 14 may communicate to implement the distribution of the damping.

The controller 14 generates the power signal reference to the distributed inverters 18 within a farm or micro-grid. To compute the power signal reference to the inverters 18, the controller 14 obtains information about the signals to be damped, the capabilities of the various inverters 18, the operating limits of the power grid 20, and the current control status or operation of the inventers 18.

The phase locked loop 30 connects to the point of common coupling for measuring the voltage of the local power grid 20. Other connections may be used, such as connections to one or more locations in the power grid. The phase locked loop 30 measures the phases and frequencies of the voltage of the power grid 20.

The filter 32 is a low pass filter. Band pass or high pass filters may be used. The filter 32 isolates signals from the phase locked loop 30 at a desired frequency band. For damping low frequency oscillations in one example, the filter 32 has a pass band below 3 Hz or a pass band of 0.5-3 Hz. Greater or less bandwidths may be provided. Greater or lesser cut-off frequency or frequencies may be provided. By filtering, the filter 32 reduces or rejects some signals while maintaining the information from other signals, such as maintaining signals in a low frequency oscillation to be damped.

The isolated signals are output from the filter 32 to the phase compensated regulator 34. The phase compensated regulator connects with the filter 32 to determine the active ($\Delta P_{farm}^*$), reactive ($\Delta Q_{farm}^*$), or both active and reactive power to be used to damp the low frequency oscillation signals output by the filter 32. The phase compensated regulator 34 is a lead-lag network with proportional-integral control for obtaining a signal 180 degrees out of phase with a similar or same amplitude as the low frequency oscillation. The determined signal is a perturbation signal to damp the low frequency oscillations.

Rather than apply the perturbation signal to single or dedicated inverter in the power grid 20, the perturbation signal is divided up among the inverters 18 for application. The processor 26 determines the responsibility of each inverter 18. Each inverter 18 is responsible for damping part of the low frequency oscillation rather than the whole.

The processor 26 is a general processor, central processing unit, control processor, graphics processor, digital signal processor, three-dimensional rendering processor, image processor, application specific integrated circuit, field programmable gate array, digital circuit, analog circuit, combinations thereof, or other now known or later developed device for controlling inverters 18. The processor 26 is a single device or multiple devices operating in serial, parallel, or separately. The processor 26 may be a main processor of a computer, such as a laptop or desktop computer, or may be a processor for handling some tasks in a larger system, such as in a power grid control system. The processor 26 is configured by instructions, design, hardware, and/or software to be able to perform the acts discussed herein.

The processor 26 (see FIG. 1) generates the control reference signals for the inverters 18 based on the perturbation signal output from the connected phase compensated regulator 34. A reference signal distribution algorithm distributes responsibility for a portion of the farm level perturbation signals ($\Delta P_{farm}^*$, $\Delta Q_{farm}^*$) to each inverter 18 by modifying the individual inverter reference commands. Any function may be used to divide the damping among the inverters 18. All or only a sub-set of inverters 18 are used for damping. The processor 26 causes each inverter 18 to damp by the same or different amounts.

FIG. 3 shows one embodiment of a flow chart of a reference signal distribution algorithm. The processor 26 is configured to implement the distribution. In act 40, various measurements and calculations are performed. Different, additional, or fewer measurements or types of information may be obtained.

The low frequency oscillation of the power grid is measured. In one embodiment, the voltage and current are measured and the oscillation frequency is tracked through a PLL. Then, the farm level reactive and active power output are computed. A phase compensator regulator 34 implemented either in a digital (processor 26) or analog manner then determines the farm or grid level active and reactive power perturbation signals ($\Delta P_{farm}^*$, $\Delta Q_{farm}^*$) to damp the low frequency oscillation of the power grid 20.

The individual inverter output powers are also measured or received via the communications interface. The active and reactive power changes ($\Delta P_{inv}$, $\Delta Q_{inv}$) provided by each inverter 18 are determined.

Another measurement is of the voltage (V) of the power grid 20. The output of the phase locked loop 30 provides the frequency and phase angle of voltage at PCC.

The relative contribution of active and reactive power of each inverter 18 to the overall power grid is determined. The processor 26 calculates an inverse of the active power rating ($R_p$) of each inverter 18. For example, $1/R_p=1/kW_{inv}/kW_{farm}$ is calculated. These inverse values represent the relative contribution of each inverter 18 to the farm or micro grid.

The processor 26 also calculates an inverse of the reactive power rating ($R_Q$) for each inverter 18. For example, $1/R_Q=1/kVar_{inv}/kVar_{farm}$ is calculated. The ratings are based on the inverter kVA rating.

In act 42, the change in voltage of the grid is checked. The change in voltage is a change that would be caused by the additional damping power. The change in voltage is a maximum amplitude of the damping. The voltage on the power grid 20 caused by the new power output of the farm or local grid is calculated using load flow algorithms.

In act 44, the processor 26 verifies that the change in voltage of the active and reactive power to damp the low frequency oscillation results in an overall voltage that is within a threshold range of operation. The voltage at the PCC is measured periodically, such as every few milliseconds. The voltage is determined as an instantaneous value or a moving average. The change in voltage is added to the voltage of the power grid. The sum is compared to the maximum and minimum voltages for the power grid to ensure that the point of common coupling or grid voltage will remain in an acceptable range. If the voltage would be outside the acceptable range, such as outside a 10% regulation or 90-110% of nominal, then the active and reactive power to damp are recalculated in act 46. The recalculation may begin the process again or may adjust to provide some but less damping.

If the change in voltage will result in the grid voltage being acceptable, then the amount of damping to be applied by each inverter 18 is calculated in act 48. The active and reactive powers of the perturbation are divided among the inverters 18. The division is based on any consideration. In one embodiment, the ratings or relative contribution of the inverters 18 to the power of the power grid 20 is used. For example, the inverse rating for each inverter 18 is multiplied by the power for the perturbation. This may be represented as $\Delta P_{inv}^*=(1/R_p) \Delta P_{farm}^*$ for active power and $\Delta Q_{inv}^*=(1/R_Q) \Delta Q_{farm}^*$ for reactive power. The active and reactive power for damping is divided based on the active and reactive power contribution of each inverter 18 to the power grid 20. The active power and the reactive power for damping are divided among the inverters 18 based on the relative inverter rating 18.

The calculated contribution is for a power change to damp the oscillations. In act 50, the signals controlling the different inverters 18 are changed to provide the damping. The inverter active and reactive control signals are altered to account for the damping as divided among the inverters 18. The active and reactive power to be provided by each of the inverters 18 is calculated by adding the change for damping. The change and resulting total active and reactive power for each inverter 18 is the same or different than for other inverters 18. Since different inverters 18 provide different contributions in power, different amounts of damping and corresponding change in powers are provided by the different inverters 18.

The control signals are determined for a given time. At a given time or over a particular period, different powers and/or changes in power are provided for different inverters 18. The powers for the inverters 18 and/or the relative contribution to damping may vary over time.

In act 52, the modified control reference signals are verified to be within the capabilities of the inverters 18. The active power for each inverter 18 is compared to the maximum rating capability of the inverter. If the active power is greater than the maximum, then the maximum power is used as shown in act 54. The inverter 18 may damp, but not as much. Alternatively, the contribution to damping for the inverter 18 is set to zero.

In acts 56 and 58, the reactive power for each inverter 18 is compared to the maximum rating capability of the inverter 18. Any changes to avoid exceeding the maximum reactive power for each inverter 18 are performed.

If any of the active and/or reactive power settings for one or more inverters exceeds the maximum, then the inverter 18 may not contribute as much or at all to the damping. The process may continue despite this change. Alternatively, the amount of damping for one or more other inverters 18 is increased to make up the difference. In alternative embodiments, the maximum check of acts 52 and 56 is incorporated into the calculation of the individual contribution in act 50 so that an iterative solution satisfying the constraints of the various inverters 18 is found.

In act 60, the active and reactive power control reference signals are sent to the inverters 18. The control signals are distributed to the inverters 18. The inverters 18 use the reference commands to set active and reactive power. Some of the active and reactive power, at least for one or more of the inverters 18, damps oscillations in the power grid 20.

Referring to FIG. 1, the controller 14 includes a memory 28. The memory 28 is a random access memory, system memory, cache memory, hard drive, optical media, magnetic media, flash drive, buffer, database, combinations thereof, or other now known or later developed memory device for storing measurements, signals, commands, communications, or other information.

The memory 12 or other memory is alternatively or additionally a computer readable storage medium storing data representing instructions executable by the programmed processor 26 for stabilizing a power system. The instructions for implementing the processes, methods and/or techniques discussed herein are provided on non-transitory computer-readable storage media or memories, such as a cache, buffer, RAM, removable media, hard drive or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

Figure 4:
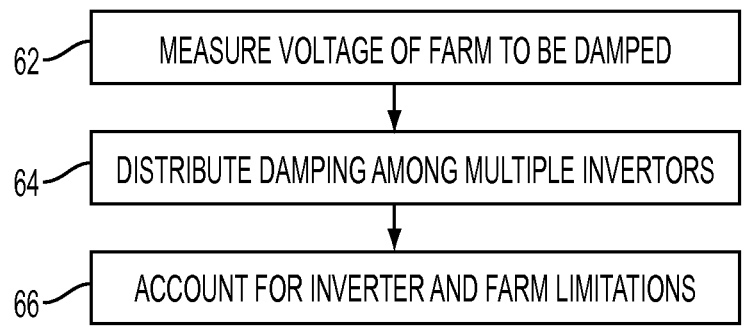
FIG. 4 is a flow chart diagram of one embodiment of a method for stabilizing a power system.

FIG. 4 shows one embodiment of a method for stabilizing a power system. The method is implemented by the system of FIG. 1, the system of FIG. 2, or another system. The acts are performed in the order shown or other orders. Additional, different, or fewer acts may be provided. For example, the acts of FIG. 3 are performed. As another example, act 66 is not performed.

In act 62, a voltage to be damped is measured. The voltage is measured for a renewable power grid rather than or in addition to measuring voltage at individual power sources. For example, the micro-grid voltage is measured at a point of common coupling or other part of the power grid. The voltage at different parts may be measured. The measurements are at one or more locations in the renewable power grid interconnecting a plurality of power sources powered by renewable energy, such as wind, solar, thermal, wave, or other sources.

The voltage is measured to identify any undesired oscillations. For example, low frequency oscillations may destabilize the power grid. The voltage is measured to identify the low frequency oscillation.

Rather than damp the low frequency oscillation at one location, the damping is distributed in act 64. The damping is distributed to different locations within the power grid. Each location performs part of the damping. In the aggregate, the low frequency oscillation is reduced or removed.

In one embodiment, the damping is distributed among existing voltage source converters of the power grid. The voltage source converters already exist to connect the power sources to the grid. Rather than adding additional components to damp, the voltage source converters damp.

Different converters damp by the same or different amounts. Voltage source converters with different capabilities or ratings are used in a same power grid. In one embodiment, the damping is evenly divided among the available converters. In another embodiment, the distribution accounts for the differences in the converters. The ratings of the converters may be used, such as assigning damping as a function of rating. The current output power provided by the converters may be used such that converters with different output powers contributed to the damping by different amounts. The relative power or ratings of the converters to the damping for the grid may be used. Combinations of rating and current output power may be used.

The converters are controlled. A central or single location determines the damping to be performed by the different converters and communicates with the converters to arrange for the distributed damping. The converters are distributed throughout the power grid, such as having at least two converters and associated power sources at different geographical locations and/or connected to the power grid at different points on a transmission line or to different transmission lines. The control for determining the distribution of the damping is at yet another location, such as the point of common coupling. Alternatively, the control is at one or both of the converters or elsewhere. Communications between converters or different controllers may allow for distributed control of the distributed damping.

The control causes the converters to damp the voltage. One or more converters damp the undesired oscillation, such as adding voltage or current signals of opposite phase but lesser amplitude. In combination, the damping by multiple converters removes or reduces the undesired oscillation. Different converters may damp with signals shifted by different amounts or different phases.

The distributed damping may not change an average power output of the power grid. The power perturbations are distributed across each or some converters without significantly changing the average farm power output or micro grid power flow to the grid.

In act 66, various factors or limitations are accounted for in the distribution of the damping. The ratings of the converters may be considered. For example, the damping is not distributed or the converter contributes less where the damping contribution may exceed the maximum rating of the converter. As another example, the voltage of the power grid is accounted for in the damping. The change in voltage to be caused by the damping is checked to make sure the maximum and/or minimum grid voltage is not exceeded. In another example, the electrical characteristics of the power grid are accounted for in the damping. The impedance (e.g., resistance and/or reactance) of the grid are accounted for by separately determining active and reactive power damping components. Different, additional, or fewer limitations or constraints may be considered for distributing the damping of the power grid oscillation to multiple converters.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A system for stabilizing a power system, the system comprising:
  a power grid of transmission lines;
  a plurality of sources of power;
  a plurality of inverters connecting respective sources of power to the transmission lines of the power grid; and
  a controller configured to measure a low frequency oscillation of the transmission lines of the power grid and to distribute signals over a communications network to the inverters, wherein the signals control the different inverters to damp different amounts of the low frequency oscillation at a given time;
  wherein the controller is configured to calculate an active and a reactive power to damp the low frequency oscillation of the power grid by dividing the active and reactive powers among the inverters and wherein the controller is configured to calculate a first relative contribution to the power grid of each inverter and a second relative contribution to the power grid of each inverter, and wherein the active power is divided among the inverters based on the first relative contribution to the power grid dependent on individual inverter rating and the reactive power is divided among the inverters based on the second relative contribution to the power grid dependent on individual inverter rating.

2. The system of claim 1 wherein the power grid comprises a wind turbine farm and the sources of power comprise wind turbines.

3. The system of claim 1 wherein the power grid comprises a solar farm and wherein the sources of power comprise photovoltaics.

4. The system of claim 1 wherein the power grid comprises a micro grid and the sources of power comprise turbines, batteries, photovoltaics, or combinations thereof.

5. The system of claim 1 wherein the inverters comprise voltage source converters, different ones of the voltage source converters connected with different ones of the sources.

6. The system of claim 1 wherein the controller comprises a phase locked loop connected to a point of common coupling, a filter connected to the phase locked loop, a phase compensated regulator connected with the filter, and a processor connected to the phase compensated regulator and the communications network, the communications network connected with the inverters.

7. The system of claim 1 wherein the controller is configured to alter inverter active and reactive control signals to the inverters based on the divided active and reactive powers to damp the low frequency oscillation.

8. The system of claim 7 wherein the controller is configured to verify that the alterations of the inverter active and reactive control signals do not exceed maximums for the corresponding inverters.

9. The system of claim 1 wherein the controller is configured to verify that a change in voltage of the active and reactive power to damp the low frequency oscillation is within a range.

10. The system of claim 1 wherein the controller comprises a centralized controller of the power grid.

11. The system of claim 1 wherein the controller is configured to calculate a relative contribution of each inverter, and wherein power for damping is divided among the inverters based on the relative contribution.

12. A system for stabilizing a power system, the system comprising:
  a power grid;
  a plurality of sources of power;
  a plurality of inverters connecting respective sources of power to the power grid; and
  a controller configured to measure a low frequency oscillation of the power grid and to distribute signals to the inverters, wherein the signals control the different inverters to damp different amounts of the low frequency oscillation at a given time;
  wherein the controller is configured to calculate an active and a reactive power to damp the low frequency oscillation of the power grid by dividing the active and reactive powers among the inverters and wherein the controller is configured to calculate a first relative contribution to the power grid of each inverter and a second relative contribution to the power grid of each inverter, and wherein the active power is divided among the inverters based on the first relative contribution to the power grid dependent on individual inverter rating and the reactive power is divided among the inverters based on the second relative contribution to the power grid dependent on individual inverter rating.

13. The system of claim 12 wherein the controller is configured to alter inverter active and reactive control signals to the inverters based on the divided active and reactive powers to damp the low frequency oscillation.

14. The system of claim 13 wherein the controller is configured to verify that the alterations of the inverter active and reactive control signals do not exceed maximums for the corresponding inverters.

15. The system of claim 12 wherein the controller is configured to verify that a change in voltage of the active and reactive power to damp the low frequency oscillation is within a range.

* * * * *